(12) United States Patent
Yoshida

(10) Patent No.: US 9,162,534 B2
(45) Date of Patent: Oct. 20, 2015

(54) PNEUMATIC TIRE

(75) Inventor: Yukishi Yoshida, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 806 days.

(21) Appl. No.: 13/458,801

(22) Filed: Apr. 27, 2012

(65) Prior Publication Data
US 2012/0273108 A1 Nov. 1, 2012

(30) Foreign Application Priority Data

Apr. 28, 2011 (JP) ................. 2011-101691

(51) Int. Cl.
B60C 11/12 (2006.01)
B60C 11/03 (2006.01)
B60C 11/11 (2006.01)

(52) U.S. Cl.
CPC ............ *B60C 11/12* (2013.01); *B60C 11/0302* (2013.04); *B60C 11/1259* (2013.04); *B60C 2011/0346* (2013.04); *B60C 2011/0367* (2013.04); *B60C 2011/0383* (2013.04); *B60C 2011/1209* (2013.04)

(58) Field of Classification Search
CPC ...... B60C 11/03; B60C 11/032; B60C 11/12; B60C 11/1259; B60C 2011/0346; B60C 2011/0367; B60C 2011/0393; B60C 2011/1209; B60C 2011/0381

USPC ........ 152/209.18, 209.25, 209.8, 209.9, 209, 152/28, 209.28
See application file for complete search history.

(56) References Cited

U.S. PATENT DOCUMENTS

| 5,435,366 | A | * | 7/1995 | Voigt et al. | ............... 152/209.18 |
| 2003/0019555 | A1 | | 1/2003 | Nakagawa | |
| 2010/0132864 | A1 | * | 6/2010 | Colombo et al. | .......... 152/209.8 |

FOREIGN PATENT DOCUMENTS

JP 2003-11618 A 1/2003

* cited by examiner

*Primary Examiner* — Eric Hug
(74) *Attorney, Agent, or Firm* — Birch Stewart Kolasch & Birch, LLP

(57) ABSTRACT

A pneumatic tire with a designated rotational direction comprises a tread portion, a pair of center circumferential main grooves extending on both sides of a tire equatorial plane, a center land portion between the center circumferential main grooves, a ripe provided with the center land portion, a plurality of V-shaped grooves each provided separately in the center land portion, each V-shaped groove having a peak located in a middle area of the center land portion, the first inclined portion extending from the peak to one side edge of the center land portion, and the second inclined portion extending from the peak to the other side edge of the center land portion, and a first inclined sub-groove and a second inclined sub-groove provided between a pair of V-shaped grooves, the first inclined sub-groove and the second inclined sub-groove being provided separately in the circumferential direction of the tire.

13 Claims, 4 Drawing Sheets

PRIOR ART

PNEUMATIC TIRE

BACKGROUND OF THE INVENTION

1. Field of the Invention

The present invention relates to a pneumatic tire that is suitable for a studless tire or the like, and can be improved in on-ice performance without exerting any influence on other tire performance.

2. Description of the Related Art

To achieve improvement of on-ice performance, studless tires have a large number of sipes on blocks or the like at a tread portion so as to increase a tread surface scratching force (edge effect) by the edges of the sipes. In addition, studless tires have a higher land ratio of a tread pattern to increase a ground-contact area and enhance a traction force with respect to an ice surface.

In recent years, for decreasing side slips on an icy road and enhancing grip performance on cornering (lateral grip performance), there has been demand that sipes be inclined in a tire axial direction so as to have a larger edge component in a circumferential direction thereof. However, as shown in FIG. 4, if an inclined angle θ of sipes "a" with respect to a tire axial direction is large, brock parts "b" divided by the sipes "a" become virtually small in thickness t, which leads to reduction in block rigidity, thereby resulting in deteriorated wear resistance, for example.

In light of such circumstances, the inventor of the subject invention has conducted research and revealed the following matters.

First, a center region of a tread portion on a tire equatorial plane side is under a higher ground-contact pressure compared with other regions. Accordingly, the center region delivers high levels of edge effect and traction force, which makes high contribution to on-ice performance. Therefore, it is possible to improve on-ice performance with a limited land ratio by increasing relatively a width of a center land portion disposed in the center region in the tire axial direction.

Next, it is possible to increase circumferential edge components and further improve on-ice performance by providing the center land portion with v-shaped grooves. This achieves further higher block rigidity and suppresses an adverse effect on other tire performance, such as deterioration in wear resistance, as compared with the case of providing the center land portion with inclined grooves, for example.

SUMMARY OF THE INVENTION

A main object of the present invention is to provide a pneumatic tire that is capable of improving on-ice performance without exerting any influence on other tire performance such as wear resistance. According to the present invention, a pneumatic tire with a designated rotational direction comprises a tread portion, a pair of center circumferential main grooves extending on both side of a tire equatorial plane of the tread portion, a center land portion between the center circumferential main grooves, a sipe provided with the center land portion, a plurality of v-shaped grooves each provided separately in the circumferential direction of the tire with the center land portion, each v-shaped groove having a peak located in a middle area of the center land portion, the first inclined portion extending from the peak to one side edge of the center land portion, and the second inclined portion extending from the peak to the other side edge of the center land portion, a first inclined sub-groove and a second inclined sub-groove provide between a pair of v-shaped grooves, the first inclined sub-groove extending from the one side edge of the center land portion toward the tire equatorial plane having the same inclined direction with the first inclined portion, the second inclined sub-groove extending from the other side edge of the center land portion toward the tire equatorial plane having the same inclined direction with the second inclined portion, the first inclined sub-groove and the second inclined sub-groove being provided separately in the circumferential direction of the tire, and a width of the center land portion being in a range of from 15% to 21% of a tread width.

DESCRIPTION OF THE PREFERRED EMBODIMENTS

Figure 1:
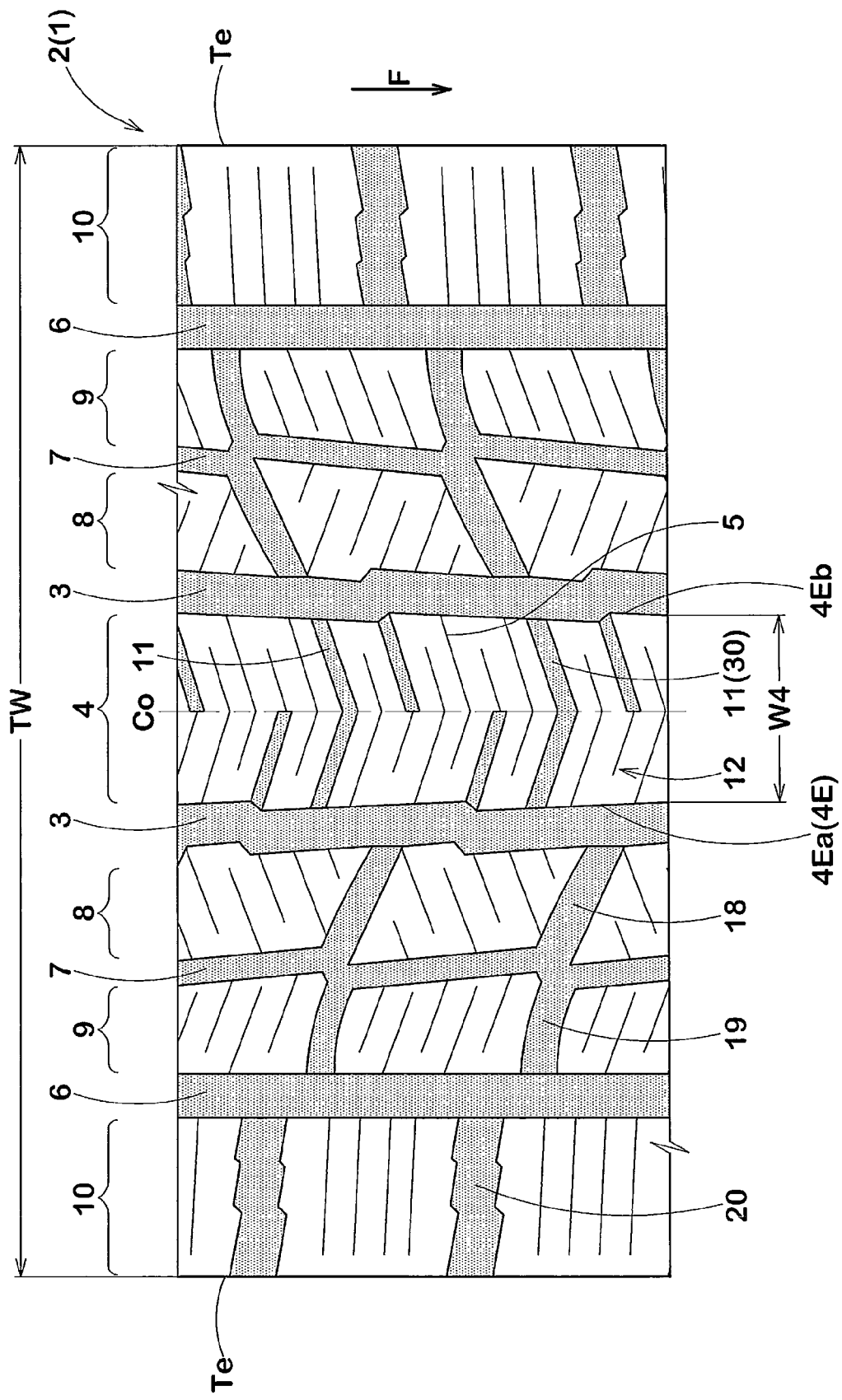
FIG. 1 is a development view showing one embodiment of a tread pattern of a pneumatic tire of the present invention.

An embodiment of the present invention will next be described with reference to the figures. FIG. 1 is a development view of a tread pattern where the pneumatic tire of the present invention is formed as a studless tire for passenger automobile.

In FIG. 1, the pneumatic tire 1 of this embodiment is a tire with a directional pattern in which a tire rotational direction F is designated, and a tread portion 2 is provided with a pair of center circumferential main grooves 3 and 3 on both sides of a tire equatorial plane co. Accordingly, a center land portion 4 is divided between the center main grooves 3 and 3. The center land portion 4 has sipes 5. The pneumatic tire 1 of this embodiment has a land ratio set in a range of from 65 to 75% from the viewpoint of assurance of on-ice performance and on-snow performance.

In this embodiment, the tread portion 2 has six circumferential main grooves including the center circumferential main grooves 3 and 3; shoulder circumferential main grooves 6 and 6 disposed along tread edges Te; and middle circumferential main grooves 7 and 7 disposed between the center main grooves 3 and the shoulder main grooves 6. Accordingly, the tread portion 2 is divided into a total of seven land portions including the center land portion 4 between the center main grooves 3 and 3; inner middle land portions 8 between the center main grooves 3 and the middle main grooves 7; outer middle land portions 9 between the middle main grooves 7 and the shoulder main grooves 6; and shoulder land portions 10 between the shoulder main grooves 6 and the tread edges Te.

The center land portion 4 has a width W4 set in a range of from 15 to 21% of a tread width TW between the tread edges Te and Te. The center land portion 4 is under a higher ground-contact pressure compared with the other land portions 8 to 10, and thus delivers high levels of edge effect and traction force, which makes high contribution to on-ice performance. Therefore, it is possible to improve on-ice performance within a limited range of land ratio by forming the center land portion 4 with a larger width. The width W4 refers to an axial width measured on a tread surface between side edges 4Ea and 4Eb (also collectively referred to as side edges 4E). If the width W4 varies in the circumferential direction of the tire as in this embodiment, an average of a maximum value and a minimum value thereof is defined as width W4. In this embodiment, of the land portions 4 and 8 to 10, the center land portion 4 has a largest width and the shoulder land portions 10 have a second largest width.

The main grooves 3, 6, and 7 are defined as circumferential grooves with a width of 4.0 mm or more in a direction perpendicular to a direction of groove length. If the groove width varies in the circumferential direction, the groove width is set at a value of an average of a maximum and a minimum values.

Figure 2:
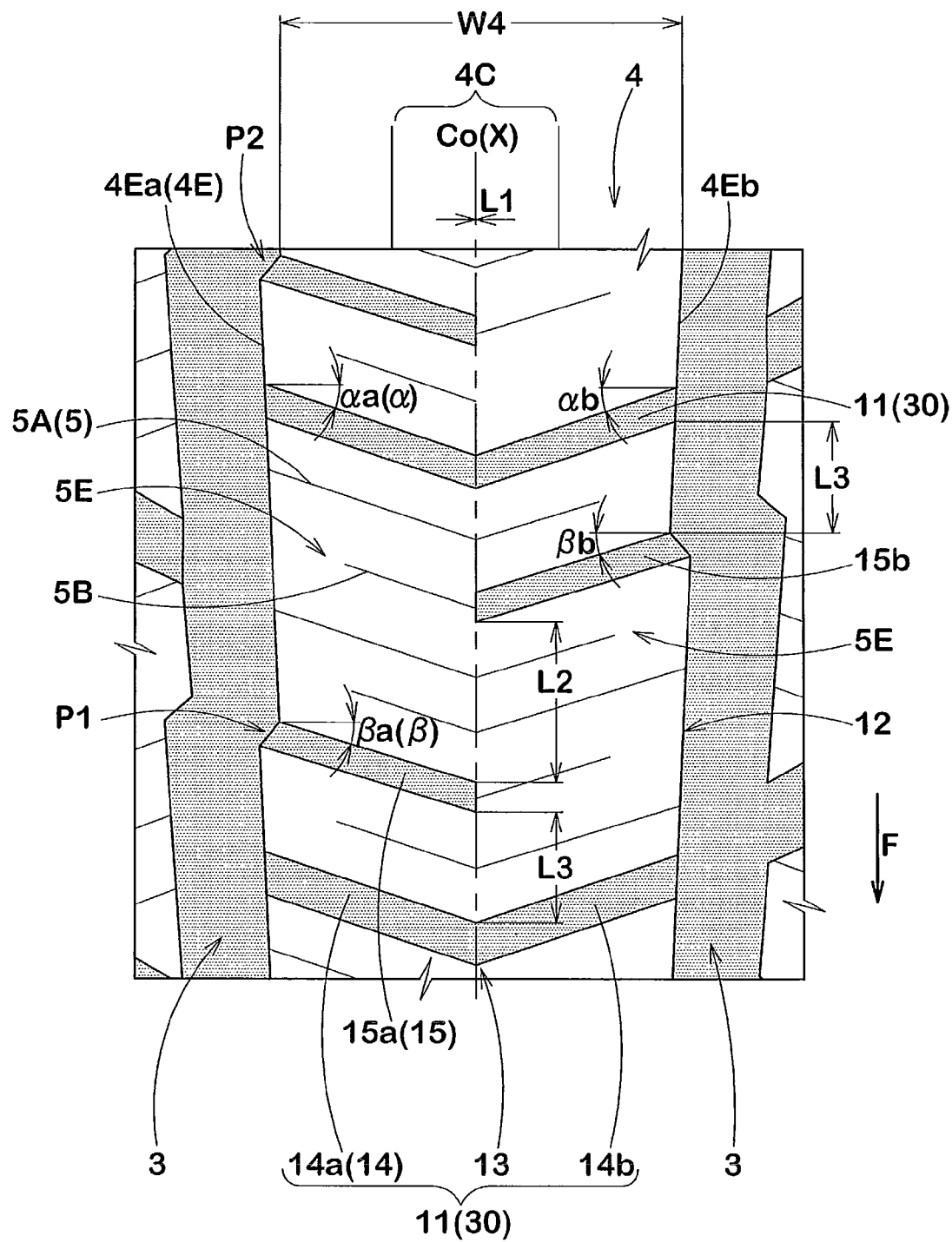
FIG. 2 is an enlarged view of a part of FIG. 1.

The center land portion 4 has v-shaped grooves 11 as lateral grooves 30 spaced in the circumferential direction of the tire. Accordingly, the center land portion 4 is formed as a block row in which the v-shaped blocks 12 are aligned. As shown in FIG. 2, the v-shaped grooves 11 each include a peak 13 located in a middle area 4C of the center land portion 4; and first and second inclined portions 14a and 14b that extend with an inclination in a direction opposite to the tire rotational direction F toward the first and second side edges 4Ea and 4Eb (also collectively referred to as "inclined portions" 14). The central region 4c refers to a region at a distance of 20% of the W4 from the tire equatorial plane Co to the both sides. Therefore, a distance L1 of the peak 13 from the tire equatorial plane Co is 20% or less of the width W4.

The v-shaped blocks 12 are each provided with one first inclined sub-groove 15a extending from the first side edge 4Ea toward the tire equatorial plane Co in the same inclined direction as that of the first inclined portion 14a; and one second inclined sub-groove 15b extending from the second side edge 4Eb toward the tire equatorial plane Co in the same inclined direction as that of the second inclined portion 14b. These inclined sub-grooves 15a and 15b do not intersect with each other but are spaced with a circumferential distance therebetween. The first inclined sub-groove 15a and the second inclined sub-groove 15b may also be collectively referred to simply as inclined sub-grooves 15.

The first inclined sub-groove 15a and the second inclined sub-groove 15b do not extend beyond a circumferential reference line X passing through the peaks 13, but are terminated on or in front of the reference line X. In this embodiment, the tire equatorial plane Co and the reference line X are aligned to each other, that is, the distance L1 is 0.

An angle α formed by the inclined portion 14 of the v-shaped groove 11 with respect to the tire axial direction, and an angle β formed by the inclined sub-groove 15 with respect to the tire axial direction, are set in a range of from 5 to 30 degrees. Specifically, an angle αa formed by the first inclined portion 14a, an angle αb formed by the second inclined portion 14b, an angle βa formed by the first inclined sub-groove 15a, and an angle βb formed by the second inclined sub-groove 15b, are each set in a range of from 5 to 30 degrees with respect to the tire axial direction. In this arrangement, the angles αa, αb, βa, and βb may be different. From the viewpoint of straight-ahead driving stability, however, an angular difference |αa−αb| between the first and second inclined portions 14a and 14b is preferably 10 degrees or less, more preferably 5 degrees or less, further preferably 0 degree. In addition, an angular difference |βa−βb| between the first and second inclined sub-grooves 15a and 15b is preferably 10 degrees or less, more preferably 5 degrees or less, further preferably 0 degree. Further, from the viewpoint of block rigidity, an angular difference |αa−βa| between the first inclined portion 14a and the first inclined sub-groove 15a is preferably 10 degrees or less, more preferably 5 degrees or less, further preferably 0 degree. In addition, an angular difference |αb−βb| between the second inclined portion 14b and the second inclined sub-groove 15b is preferably 10 degrees or less, more preferably 5 degrees or less, further preferably 0 degree. In this example, the foregoing angular differences are set in a more preferable manner at αa=αb=βa=βb.

Figure 3:
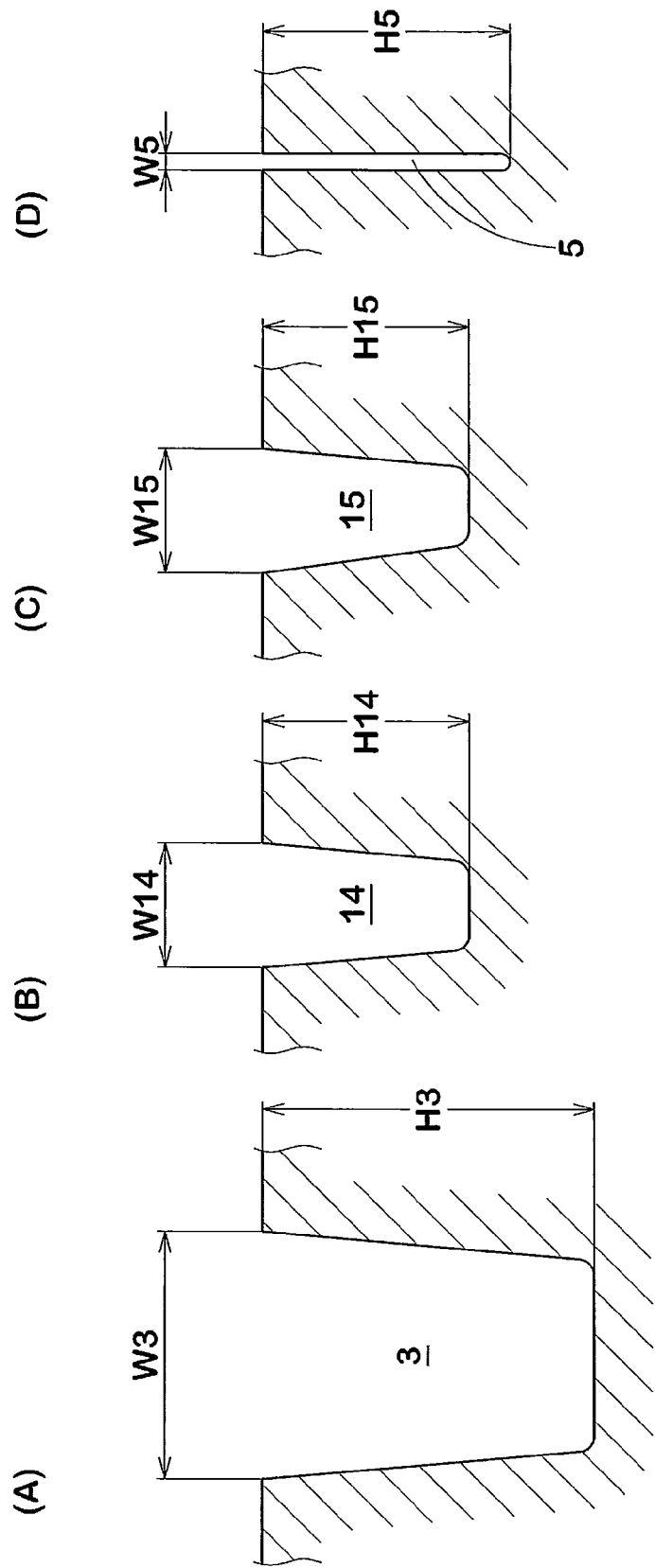
FIGS. 3A to 3D are cross section views of a center circumferential main groove, a v-shaped groove, an inclined sub-groove, and a sipe.
Figure 4:
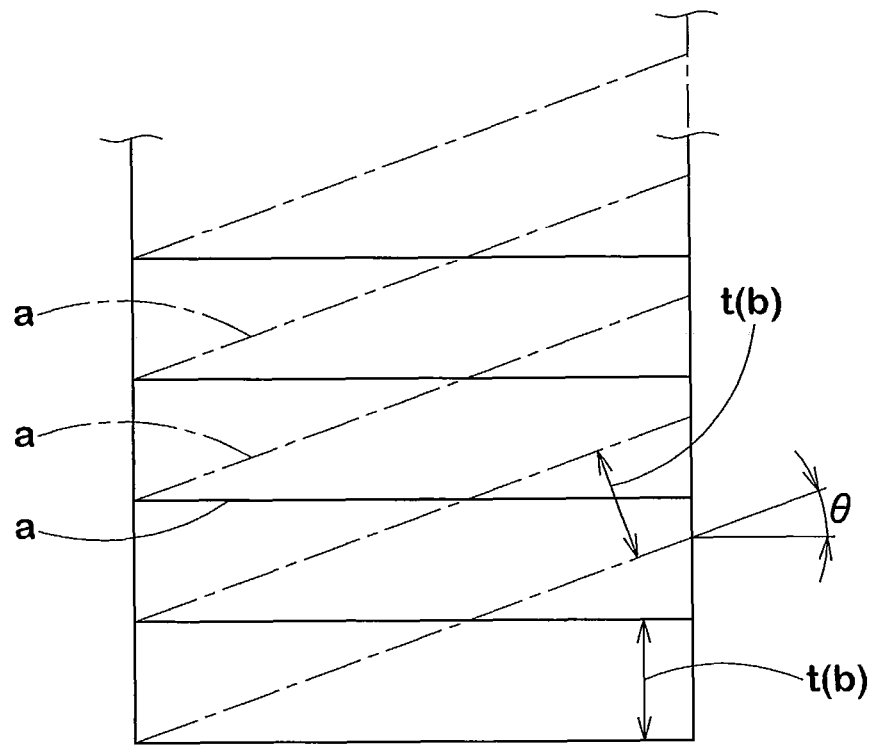
FIG. 4 is a partial enlarged view for describing sipes in blocks.

As shown in FIGS. 3A to 3c, a groove depth H14 of the inclined portion 14 and a groove depth H15 of the inclined sub-groove 15 are made smaller than a groove depth H3 of the center main groove 3. From the viewpoint of block rigidity, in particular, the groove depth H14 of the inclined portion 14 and the groove depth H15 of the inclined sub-groove 15 are preferably set in a range of from 55 to 65% of the groove depth H3. The groove depth H14 and the groove depth H15 may be different within the foregoing range. From the viewpoint of rigidity balance, however, the groove depths are preferably set at H14=H15. The groove width w14 of the inclined portion 14 and the groove width w15 of the inclined sub-groove 15 are desirably set smaller than the groove width w3 of the center main groove 3, and are preferably set within a range of from 2.0 to 3.0 mm.

The V-shaped blocks 12 each have sipes 5 formed therewithin. The sipes 5 are formed in parallel with the V-shaped grooves. Specifically, the sipes 5 are each formed by a first V-shaped sipe 5A that is disposed between the V-shaped groove 11 and the inclined sub-groove 15 and is made parallel with the V-shaped groove 11; and a second straight sipe 5B that is connected to an inner edge of the inclined sub-groove 15 and is made parallel with the inclined portion 14 of the V-shaped groove 11. In addition, in this embodiment, the sipes 5 each have at one end an end portion 5E discontinued within the V-shaped block 12. The sipes 5 are disposed such that the end portions 5E appear alternately on one side and the other side in the tire axial direction.

As described above, the tire 1 of this embodiment allows an edge effect and a traction force to work more effectively with a limited land ratio, thereby to improve on-ice performance, by making wider the center land portion 4, which is under a high ground-contact pressure and makes a large contribution to on-ice performance.

The V-shaped grooves 11 provided at the center land portion 4 increase circumferential edge components by the inclined portions 14, thereby to decrease side slips on an ice surface and enhance lateral grip performance. The V-shaped blocks 12 divided by the V-shaped grooves 11 each have a V-shape with one wing portion and the other wing portion tied up to each other, and are less prone to be deformed and thus enhance block rigidity, as compared with parallelogram blocks divided by inclined grooves, for example. This makes it possible to exert an edge effect more effectively, thereby making a further contribution to improvement of on-ice performance. The V-shaped blocks 12 are less prone to be worn due to high block rigidity, which makes it possible to suppress deterioration in wear resistance, uneven wear resistance, and the like. In addition, the inclined sub-grooves 15 formed between the V-shaped grooves 11 and 11 further increase circumferential edge components while maintaining high block rigidity in the V-shaped blocks 12, thereby further contributing to improvement of on-ice performance.

The sipes 5 in the V-shaped blocks 12 are formed in parallel with the V-shaped grooves 11, and further increase circumferential edge components while minimizing deterioration in block rigidity, thereby further improving on-ice performance.

When the width W4 of the center land portion 4 is less than 15% of the tread width TW, the tire tends to not sufficiently produce the effect of improving on-ice performance. In contrast, when the width W4 of the center land portion 4 is larger than 21% of the tread width TW, the tire tends to suffer from deterioration in wet grip performance such as decreased drainage property. From this viewpoint, the width W4 is more preferably 16% or more and 20% or less of the tread width TW.

If the angles αa and αb formed by the inclined portions 14 and the angles βa and βb formed by the inclined sub-grooves 15 are less than 5 degrees, the increase of circumferential edge components cannot be expected and thus the tire is deteriorated in on-ice performance. In contrast, if the angles αa, αb, βa, and βb exceed 30 degrees, it is difficult to provide block rigidity, which leads to deterioration in wear resistance, uneven wear resistance, and the like. From this viewpoint, the angles αa, αb, βa, and βb are more preferably 15 degrees or more and 21 degrees or less.

If the distance L1 in the tire axial direction of the peaks 13 of the V-shaped grooves 11 and the tire equatorial plane Co exceeds 20% of the width W4, the V-shaped grooves become less effective, thereby to cause deterioration in block rigidity. In addition, in this case, the symmetry property of the pattern becomes lower, which is disadvantageous in straight-ahead driving stability. From this viewpoint, the distance L1 is preferably 10% or less of the width W4, more preferably 5% or less, further preferably 0%.

In this embodiment, in each of the V-shaped blocks 12, a circumferential interval L3 from the inclined sub-groove 15 to the V-shaped groove 11 adjacent to the inclined sub-groove 15 in the tire circumferential direction is smaller than a circumferential interval L2 between the first and second inclined sub-grooves 15a and 15b. To provide block rigidity, the interval L2 between the inclined sub-grooves 15 and 15 needs to be over a certain extent. The interval L2 can be provided with a limited block length by disposing the inclined sub-grooves 15 close to the V-shaped grooves 11 (that is, setting the smaller interval L3).

In each of the V-shaped blocks 12, the number n1 of the sipes 5 between the inclined sub-grooves 15 and 15 is preferably larger than the number n2 of the sipes 5 between the inclined sub-groove 15 and the V-shaped groove 11. This makes it possible to increase the number of the sipes 5 to thereby enhance on-ice performance while maintaining block rigidity. In this example, the numbers of the sipes 5 are set at n1=2 and n2=1.

As shown in FIG. 3D, a depth H5 of the sipe 5 is preferably larger than the groove depth H14 of the inclined portion 14 (equivalent to the groove depth of the V-shaped groove 11) and the groove depth H15 of the inclined sub-groove 15. This makes it possible to produce an edge effect effectively while maintaining block rigidity. From the viewpoint of maintaining block rigidity, the depth H5 of the sipe 5 preferably falls in a range of from 70 to 80% of the groove depth H3 of the center main groove 3.

The side edges 4E of the center land portion 4 are each inclined from an intersection P1 between the inclined sub-groove 15 and the side edge 4E to an intersection P2 between other inclined sub-groove 15 adjacent to the inclined sub-groove 15 in a direction opposite to the tire rotational direction F and the side edge 4E, axially outwardly in the direction opposite to the tire rotational direction F. This forms stepped portions D at opening ends of the inclined sub-grooves 15, thereby improving traction performance.

As shown in FIG. 1, the inner middle land portions 8, the outer middle land portions 9, and the shoulder land portions 10, have lateral grooves 18, 19, and 20, respectively, spaced in the circumferential direction. Accordingly, each land portion 8, 9, and 10 is formed as a block line. The lateral grooves 18, 19, and 20 extend in the same inclined direction as that of the inclined portions 14 of the V-shaped grooves 11, and pitches of the lateral grooves 18, 19, and 20 are the same as a pitch of the V-shaped grooves 11. Groove widths of the lateral grooves 18, 19, and 20 are larger than the groove widths W14 and W15 of the inclined portions 14 and the inclined sub-grooves 15.

As in the foregoing, a preferred embodiment of the present invention is described above. However, the present invention is not limited to the illustrated embodiment, and can be modified and carried out in various manners.

Comparative Test:

Based on the tread pattern shown in FIG. 1, studless tires (tire size: 225/65R17) were produced in accordance with specifications shown in Table 1 in which inclination angles of the lateral grooves 30 (V-shaped grooves 11), inclined sub-grooves 15, and sipes 5, and width W4 are modified at the center land portion 4. The sample tires were tested for on-ice performance, uneven wear resistance, and drainage performance.

Other specifications are identical as follows:
Tread pattern: As shown in FIG. 1
Tread width TW: 180 mm
Land ratio: 70%
Circumferential Main Grooves
   Center main groove width: 4.9 mm, center main groove depth: 11.0 mm
   Middle main groove width: 3.3 mm, middle main groove depth: 9.0 mm
   shoulder main groove width: 7.0 mm, shoulder main groove depth: 11.0 mm
Sipes (Parallel to V-Shaped Grooves)
   Sipe depth: 75% of the center main groove depth Land portion width
   Shoulder land portion width (one side): 13.3% of the tread width
   changes in width of the center land portion were adjusted by the width of the middle land portion.
Test procedures are as follows:
On-Ice Performance:

The sample tires were mounted on four wheels of a vehicle under the following conditions. Then, the vehicle was run on an iced road under environments at a temperature of 0 degree Celsius, and the sample tires were evaluated by a driver's sensory rating on a scale of one to ten. Larger values indicate more excellent on-ice performance.
   Rim: 17×6.5J
   Internal pressure: 210 kPa
   Vehicle: 4 WD vehicle of 3,500-cc displacement
Uneven Wear Resistance:

The foregoing vehicle was run by a distance of 8,000 km, on a general road, a mountain road, and an express highway, with proportions of 35%, 15%, and 50%, respectively. Then, the V-shaped grooves at the center land portion and the lateral grooves of the shoulder land portions were measured in wear volume, and differences between the measurement values were represented in index number. The evaluation was made on a scale of one to ten. Larger values indicate more excellent uneven wear resistance with smaller differences in wear volume.

Drainage Performance:

The foregoing vehicle was run in a course with a water puddle 2.0 mm deep and 20 m long on an asphalt road with a radius of 100 m, and then the lateral acceleration (lateral G) of the vehicle was measured when the vehicle was started at an initial speed 80 km/h. The measurement values were represented in index number and were evaluated on a scale of one to ten. Larger values indicate more excellent drainage performance.

TABLE 1

| <Center land portion> | Example 1 | Comparative example 1 | Example 2 | Comparative example 2 | Comparative example 3 | Example 3 | Example 4 | Example 5 | Example 6 | Comparative example 4 | Comparative example 5 | Example 7 |
|---|---|---|---|---|---|---|---|---|---|---|---|---|
| width W4 <%> *1 | 18 | 12 | 18 | 12 | 24 | 15 | 21 | 18 | 18 | 18 | 18 | 18 |
| Lateral grooves | V-shaped grooves | V-shaped grooves | V-shaped grooves | V-shaped grooves | V-shaped grooves | V-shaped grooves | V-shaped grooves | V-shaped grooves | V-shaped grooves | Inclined grooves | V-shaped grooves | V-shaped grooves |
| Inclined angle α <degrees> | 18 | 18 | 12 | 12 | 24 | 18 | 18 | 5 | 30 | 18 | 18 | 18 |
| Inclined sub-grooves | Two | Two | Two | Two | Two | Two | Two | Two | Two | Two | None | Two |
| Inclined angle β <degrees> | 18 | 18 | 12 | 12 | 24 | 18 | 18 | 5 | 30 | 18 | — | 18 |
| Sipes | Six | Six | Six | Six | Six | Six | Six | Six | Six | Six | Six | Six |
| Inclined angle <degrees> | 18 | 18 | 12 | 12 | 24 | 18 | 18 | 5 | 30 | 18 | 18 | 18 |
| Distance L1 at peak <%> *2 | 0 | 0 | 0 | 0 | 0 | 0 | 0 | 0 | 0 | — | 0 | 20 |
| On-ice performance | 10 | 7 | 9 | 7 | 11 | 8 | 10 | 8 | 8 | 10 | 7 | 10 |
| Uneven wear resistance | 10 | 8 | 10 | 8 | 8 | 8 | 8 | 10 | 8 | 6 | 11 | 6 |
| Drainage performance | 9 | 10 | 9 | 9 | 6 | 9 | 7 | 7 | 10 | 8 | 8 | 9 |

*1 Land portion width W4 is represented by a ratio W4/TW to the tread width TW.
*2 Distance L1 from the tire equatorial plane to the V-shaped peak is represented by a ratio L1/TW to the tread width TW.

The test results have revealed that the tire of the embodiment in the present invention is capable of improving on-ice performance while maintaining other tire performance such as uneven wear resistance, drainage performance, and others in high levels.

What is claimed is:

1. A pneumatic tire having a designated rotational direction comprising
    a tread portion,
    a pair of center circumferential main grooves extending on both sides of a tire equatorial plane of the tread portion,
    a center land portion between the center circumferential main grooves,
    a sipe provided on the center land portion,
    a plurality of V-shaped grooves each provided separately in the circumferential direction of the tire on the center land portion to form a plurality of V-shaped blocks, each said V-shaped groove comprising a peak located in a middle area of the center land portion, a first inclined portion extending from the peak to one side edge of the center land portion, and a second inclined portion extending from the peak to the other side edge of the center land portion,
    each of said V-shaped blocks being provided with a first inclined sub-groove and a second inclined sub-groove,
    the first inclined sub-groove extending from the one side edge of the center land portion toward the tire equatorial plane having the same inclined direction with the first inclined portion,
    the second inclined sub-groove extending from the other side edge of the center land portion toward the tire equatorial plane having the same inclined direction with the second inclined portion,
    the first inclined sub-groove and the second inclined sub-groove being provided separately in the circumferential direction of the tire, and
    a width of the center land portion being in a range of from 15% to 21% of a tread width.

2. The pneumatic tire according to claim 1, wherein the first inclined sub-groove and the second inclined sub-groove do not extend beyond a circumferential reference line passing through the peak of the V-shaped groove.

3. The pneumatic tire according to claim 1 or 2, wherein an axial distance between the peak of the V-shaped groove and the tire equatorial plane is not more than 20% of the width of the center land portion.

4. The pneumatic tire according to claim 1 or 2, wherein inclined angles of the first inclined portion and the second inclined portion are in a range of from 5 to 30 degrees with respect to the axial direction of the tire.

5. The pneumatic tire according to claim 1 or 2, wherein inclined angles angle of the first inclined sub-groove and the second inclined sub-groove are in a range of from 5 to 30 degrees with respect to the axial direction of the tire.

6. The pneumatic tire according to claim 1 or 2, wherein the sipe extends parallel with the V-shaped groove.

7. The pneumatic tire according to claim 1 or 2, wherein a circumferential distance between the V-shaped groove and one inclined sub-groove is smaller than a circumferential distance between the first inclined sub-groove and the second inclined sub-groove.

8. The pneumatic tire according to claim 1 or 2, wherein a depth of the sipe is larger than both depths of V-shaped grooves and the inclined sub-grooves.

9. The pneumatic tire according to claim 1 or 2, wherein the number of sipes between the first inclined sub-groove and the second inclined sub-groove is larger than the number of sipes between the V-shaped groove and one inclined sub-groove.

10. The pneumatic tire according to claim 1 or 2, wherein the one side edge of the center land portion between a pair of first inclined sub-grooves is inclined axially outward of the tire toward anti-rotational direction.

11. The pneumatic tire according to claim 1 or 2, wherein the other side edge of the center land portion between a pair of second inclined sub-grooves is inclined axially outward of the tire toward anti-rotational direction.

12. A pneumatic tire having a designated rotational direction comprising a tread portion, a pair of center circumferential main grooves extending on both sides of a tire equatorial plane of the tread portion, a center land portion between the center circumferential main grooves, a plurality of V-shaped grooves each provided separately in the circumferential direction of the tire on the center land portion, said each V-shaped groove comprising a peak located in a middle area of the center land portion, a first inclined portion extending from the peak to one side edge of the center land portion, and a second inclined portion extending from the peak to the other side edge of the center land portion, a first inclined sub-groove and a second inclined sub-groove provide between a pair of V-shaped grooves, the first inclined sub-groove extending from the one side edge of the center land portion toward the tire equatorial plane having the same inclined direction with the first inclined portion, the second inclined sub-groove extending from the other side edge of the center land portion toward the tire equatorial plane having the same inclined direction with the second inclined portion, the first inclined sub-groove and the second inclined sub-groove being provided separately in the circumferential direction of the tire, a sipe provided on the center land portion, wherein the sipe extends parallel with the V-shaped groove, and a width of the center land portion being in a range of from 15% to 21% of a tread width.

13. A pneumatic tire having a designated rotational direction comprising a tread portion, a pair of center circumferential main grooves extending on both sides of a tire equatorial plane of the tread portion, a center land portion between the center circumferential main grooves, a plurality of V-shaped grooves each provided separately in the circumferential direction of the tire with the center land portion, said each V-shaped groove comprising a peak located in a middle area of the center land portion, a first inclined portion extending from the peak to one side edge of the center land portion, and a second inclined portion extending from the peak to the other side edge of the center land portion, a first inclined sub-groove and a second inclined sub-groove provide between a pair of V-shaped grooves, the first inclined sub-groove extending from the one side edge of the center land portion toward the tire equatorial plane having the same inclined direction with the first inclined portion, the second inclined sub-groove extending from the other side edge of the center land portion toward the tire equatorial plane having the same inclined direction with the second inclined portion, the first inclined sub-groove and the second inclined sub-groove being provided separately in the circumferential direction of the tire, a sipe provided on the center land portion, wherein a depth of the sipe is larger than both depths of the V-shaped grooves and the inclined sub-grooves, and a width of the center land portion being in a range of from 15% to 21% of a tread width.

\* \* \* \* \*